United States Patent [19]

Schittenhelm et al.

[11] Patent Number: 4,847,218

[45] Date of Patent: Jul. 11, 1989

[54] ENAMEL FRITS FOR SHEET STEEL WITH IMPROVED BONDING

[75] Inventors: Hans-Joachim Schittenhelm, Leverkusen; Werner Joseph, Cologne, both of Fed. Rep. of Germany

[73] Assignee: Bayer Aktiengesellschaft, Leverkusen, Fed. Rep. of Germany

[21] Appl. No.: 167,222

[22] Filed: Mar. 11, 1988

[30] Foreign Application Priority Data

Mar. 31, 1987 [DE] Fed. Rep. of Germany ....... 3710608

[51] Int. Cl.$^4$ .................................................. C03C 8/00
[52] U.S. Cl. .......................................... 501/21; 501/14
[58] Field of Search ..................................... 501/14, 21

[56] References Cited

FOREIGN PATENT DOCUMENTS

| | | | |
|---|---|---|---|
| 2746480 | 4/1979 | Fed. Rep. of Germany ........ | 501/21 |
| 0109243 | 8/1980 | Japan ..................... | 501/21 |
| 0977422 | 11/1982 | U.S.S.R. ................. | 501/21 |
| 1081137 | 3/1984 | U.S.S.R. ................. | 501/21 |
| 1104118 | 7/1984 | U.S.S.R. ................. | 501/21 |
| 1112016 | 9/1984 | U.S.S.R. ................. | 501/21 |

*Primary Examiner*—William R. Dixon, Jr.
*Assistant Examiner*—James M. Hunter, Jr.
*Attorney, Agent, or Firm*—Sprung Horn Kramer & Woods

[57] ABSTRACT

An enamel frit which provides improved bonding at stoving temperatures below 800° C. after the frit has been stoved on unalloyed steel which is capable of being enamelled, the frit containing 1 to 6% by weight, based on the total quantity of the frit, of bonding oxides and the other constituents so chosen that the following equation is fulfilled:

$$\Sigma \text{ monovalent atoms} + 2 \Sigma \text{ divalent atoms} -$$
$$\Sigma \text{ fluorine atoms} -$$
$$\Sigma \text{ pentavalent atoms}$$
$$= \Sigma \text{ trivalent atoms}$$
$$= \Sigma \text{ tetravalent atoms,}$$

in which the deviation from the ratio 1:1:1 is at most ±8% for each of the monovalent atoms, divalent atoms and pentavalent atoms.

The enamel frits according to the invention being useful for electrostatic powder application.

9 Claims, 1 Drawing Sheet

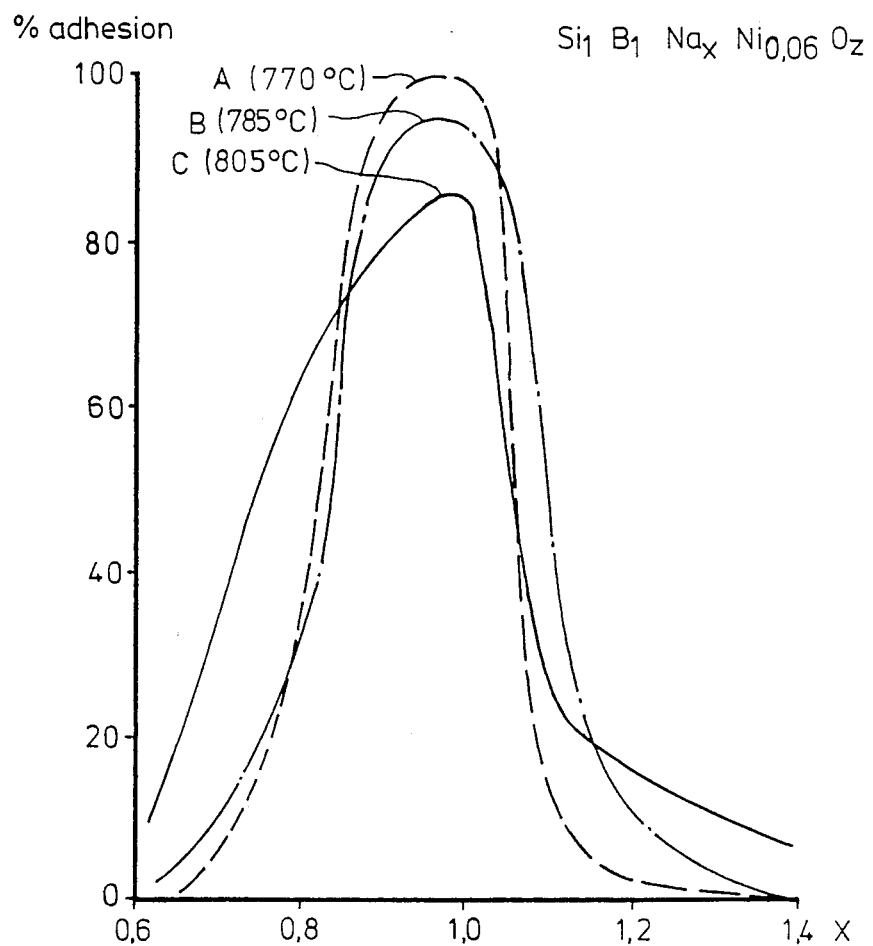

ENAMEL FRITS FOR SHEET STEEL WITH IMPROVED BONDING

BACKGROUND OF THE INVENTION

1. Field of the Invention

This invention relates to enamel frits for sheet steel with superior bonding at low stoving temperatures, in particular for use on substrates of steel which have not been pickled or nickel plated.

2. Background Information

Base and direct enamel frits have the function of establishing a firm bond between the metal workpiece and the vitreous enamel layer. The enamelling should withstand firing over a wide temperature range, have a smooth, flawless surface and undergo no loss of bonding even after repeated stoving. The development of these enamel frits has hitherto taken place empirically. So-called network forming oxides such as $SiO_2$, $TiO_2$, $ZrO_2$, $B_2O_3$ and $Al_2O_3$ were combined with network migrators such as $Li_2O$, $Na_2O$, $K_2O$, MgO, CaO, BaO or fluorides and phosphates and varied until the enamels were satisfactory in the required commercial properties such as fluidity, surface tension, thermal expansion, surface quality and bonding. To improve the bonding of base enamels, heavy metal oxides such as CoO, NiO and CuO and occasionally iron oxide, manganese oxide, molybdenum oxide or antimony oxide were added in varying quantities.

For direct enamel frits, the addition of $TiO_2$ increased the resistance of the enamelling to acid attack, while the addition of $ZrO_2$ increased the resistance to alkalies.

Molten mixtures of base enamel frits and direct enamel frits containing more than 12 oxidic constituents are therefore no rarity. In all multicomponent systems, their development is difficult to oversee and complicated and therefore expensive. The effect of any one component on certain properties of the frits is rarely proportional to its ratio by weight and is independent of other components. An incremental calculation which is recommended for simple types of glass is only rarely possible, e.g. in the case of thermal expansion, and then only approximately. An added difficulty is that several enamel frits are usually mixed together and inert substances may be added for enamel commercial requirements or reasons of economy.

For conventional two-layered or multi-layered enamelling, frits with different viscosities and melting properties were combined for the base enamel and inert substances were added to facilitate the gas reactions proceeding from the sheet steel.

The base enamels which are viscous and hard at the stoving temperature are described as filling bases, while low viscosity, soft frits which wet readily and are capable of dissolving iron oxides are known as network base enamels. The proportions in which they are mixed and the amount of quartz added depend on the quality of the steel and the thickness of the steel sheet as well as on the stoving temperature and the dwell time. Here again, the proportion of frits and the additives used for the milling process are selected empirically and either accepted or varied under practical conditions. Predictions as to the optimum properties such as compatibility of the frits with one another, bonding to differently cast qualities of steel and flow properties of the slips were rarely possible.

SUMMARY OF THE INVENTION

It has now surprisingly been found that firing resistant enamel frits which have excellent bonding properties, especially at low temperatures, and flawless surfaces over a wide stoving range are always obtained when the atomic numbers of the frit constituents fulfill the following general condition:

$$\Sigma \text{ monovalent atoms} + 2\Sigma \text{ divalent atoms} -$$
$$\Sigma \text{ pentavalent atoms} - \Sigma \text{ fluorine atoms}$$
$$= \Sigma \text{ trivalent atoms}$$
$$= \Sigma \text{ tetravalent atoms.}$$

More particularly, the frit constituents fulfill the following condition:

$$(\Sigma \text{Li-, Na, K-atoms} + 2\Sigma \text{Ba-, Ca-, Mg-atoms} - \Sigma \text{fluorine atoms} - \Sigma \text{phosphorus atoms})$$
$$= (\Sigma \text{boron atoms} + \Sigma \text{aluminum atoms})$$
$$= \Sigma \text{silicon atoms} + \Sigma \text{zirconium atoms} + \Sigma \text{titanium atoms, in which the deviation from the ratio 1:1:1 is at most} \pm 8\% \text{ for each of the three ratio components.}$$

The deviation from the ratio 1:1:1 should be at most $\pm 8\%$, preferably $\pm 6\%$ and is most preferably $\pm 4\%$ for each of the components.

BRIEF DESCRIPTION OF THE DRAWING

The FIGURE is a graph of % binding versus variable Na content in the formula $Si_1B_1Na_xNi_{0.06}O_Z$ at three temperatures.

DETAILED DESCRIPTION OF THE INVENTION

The frits according to this invention contain the following constituents within the ranges indicated, obviously so chosen that the above conditions are fulfilled:

$Na_2O$: 5–25% by weight
$K_2O$: 0–12
$Li_2O$: 0–8
BaO: 0–26
CaO: 0–16
MgO: 0–2
F: 0–10
$B_2O_3$: 5–30
$Al_2O_3$: 0–10
$SiO_2$: 25–65
$ZrO_2$: 0–16
$TiO_2$: 0–14.

If the general formula is applied to the components used for base and direct enamel frits, the following formula is obtained:

$$\Sigma \text{ alkali metal atoms} + 2\Sigma \text{ alkali earth metal atoms} - \Sigma \text{ fluorine atoms} - \Sigma \text{ phosphorus atoms} = \Sigma \text{ boron atoms} + \Sigma \text{ alumninum atoms} = \Sigma \text{ silicon atoms} + \Sigma \text{ zirconium atoms} + \Sigma \text{ titanium atoms.}$$

The bonding oxides are normally obtained by melting nickel oxide either alone or together with cobalt oxide and/or copper, manganese or iron oxide, each in quantities of 1 to 6% by weight, preferably 2 to 4% by weight, based on the total quantity of frit.

It is nowadays preferred for economical and ecological reasons to apply the base and direct enamels to steel which has not been pickled or nickel plated. This new technology provides a considerable saving in energy by dispensing with the heated pickling and rinsing baths. In addition, the process of working up and disposing of the spent pickling liquids, the nickel bath and the contaminated rinsing liquid also becomes superfluous.

It has now surprisingly been found that the enamels according to this invention are exceptionally suitable for application to steel substrates which have not been pickled or nickel plated and are superior to the usual commercial base and direct enamels.

If the slip is to be applied by flooding, immersion or spraying, it is necessary to degrease the workpieces which are to be enamelled but when the enamel frits described above are applied as powders by means of an electric field, this degreasing also becomes superfluous.

The enamel frits according to the invention are obtained by melting ordinary commercial raw materials for enamels, such as borax ($Na_2B_4O_7 \cdot 5H_2O$), quartz powder, sodium tripolyphosphate, feldspar, zirconium sand, fluor spar, alkali metal and alkaline earth metal carbonates and the corresponding heavy metal oxides at 1100° C. until they are "thread smooth", and the molten mixture is then chilled over water-cooled steel rollers. The resulting flakes are applied to 1 mm test sheets both as enamel powders in an electrostatic field and as aqueous suspensions in the form of slips by immersion or spraying, and they are then stoved in a graduated temperature oven over a temperature range of from 770° to 880° C.

The thickness of the layer of stoved enamel was 0.15 mm. The bonding test was carried out with a falling apparatus with deformation of the sheet steel and visual assessment of the bonding picture according to DEZ-Merkblatt F 6.2.

The multi-component system given in Example 1 herein below fulfils the relationship according to this invention of the atomic numbers:

$\Sigma$Alkali metal atoms (Na, K, Li) + 2$\Sigma$alkaline earth metal atoms (Mg, Ca, Ba) − $\Sigma$fluorine atoms − $\Sigma$phosphorus atoms = $\Sigma$boron atoms + $\Sigma$aluminum atoms = $\Sigma$silicon atoms + $\Sigma$zirconium atoms + $\Sigma$titanium atoms with a deviation of ± <1%.

Regardless of which method of application is employed, the frit obtained after stoving is distinguished by its smooth, flawless surface and excellent bonding over the whole temperature range of from 770° to 880° C.

When the oxidic composition described in Example 1 is modified and simplified by replacing the tetravalent Zr and Ti in $ZrO_2$ and $TiO_2$ by $SiO_2$, replacing trivalent Al in $Al_2O_3$ by $B_2O_3$ and replacing divalent Mg and Ba in MgO and BaO by CaO so that the sum of atomic numbers in the formula according to the invention: $\Sigma$ Alkali metal atoms (Na, K, Li) + 2$\Sigma$ alkaline earth metal atoms (Ca) − $\Sigma$ phosphorus atoms − $\Sigma$ fluorine atoms = $\Sigma$ boron atoms = $\Sigma$ silicon atoms is again fulfilled, then the base enamel obtained again has an excellent surface and very good bonding in the selected temperature range of from 770° to 880° C.

To prove that the atomic number formula according to this invention has general validity, the multi-component base enamels described above were simplified to a more easily overseen three-component system $Na_2O/B_2O_3/SiO_2$ free from phosphorus, alkaline earth metals and fluorine, and the only bonding oxide introduced was NiO.

The atomic number formula now reduced to $\Sigma$ sodium atoms = $\Sigma$ boron atoms = $\Sigma$ silicon atoms was then modified over a wide range of Na contents while the atomic number ratio Si:B = 1:1 was left unchanged, as will be described in Example 2 herein below.

| Frit No. | Formula | % by weight | | | |
|---|---|---|---|---|---|
| | | $SiO_2$ | $B_2O_3$ | $Na_2O$ | NiO |
| 1 | $Si_1B_1Na_{0.6}Ni_{0.06}O_z$ | 50.9 | 29.5 | 15.8 | 3.8 |
| 2 | $Si_1B_1Na_{0.7}Ni_{0.06}O_z$ | 49.6 | 28.8 | 17.9 | 3.7 |
| 3 | $Si_1B_1Na_{0.8}Ni_{0.06}O_z$ | 48.4 | 28.0 | 20.0 | 3.6 |
| 4 | $Si_1B_1Na_{0.9}Ni_{0.06}O_z$ | 47.2 | 27.4 | 21.9 | 3.5 |
| 5 | $Si_1B_1Na_{1.0}Ni_{0.06}O_z$ | 46.1 | 26.7 | 23.8 | 3.4 |
| 6 | $Si_1B_1Na_{1.1}Ni_{0.06}O_z$ | 45.0 | 26.1 | 25.5 | 3.4 |
| 7 | $Si_1B_1Na_{1.2}Ni_{0.06}O_z$ | 44.0 | 25.5 | 27.2 | 3.3 |
| 8 | $Si_1B_1Na_{1.3}Ni_{0.06}O_z$ | 43.0 | 24.9 | 28.9 | 3.2 |
| 9 | $Si_1B_1Na_{1.4}Ni_{0.06}O_z$ | 42.1 | 24.4 | 30.4 | 3.1 |

Frits Nos. 1 to 9 were used as powders without milling additives as described in German Patent Specification No. 2 025 072 and applied to test sheets under the same experimental conditions and stoved for the same lengths of time at 770° C., 785° C. and 805° C.

The falling apparatus according to DEZ Merkblatt F 6.2 was used for the bonding test. The results were assessed visually on the deformed sample, bonding stage No. 1 being given a value of 100% and bonding stage No. 5 given a value of 0%.

The results of this experimental series are represented in the accompanying diagram as stoving curves A = 770° C., B = 785° C. and C = 805° C.

It is clear from this that the best bonding, especially in the range of low temperatures of base enamel frits, is obtained with the atomic ratio Si:B:Na:(NiO) = 1:1:1:(0.06).

When there is a deviation from the value Na = 1, an increase or reduction in the Na content in the system $Si_1B_1Na_{0.6-1.4}Ni_{0.06}$ results in a deterioration of the bonding even at elevated stoving temperatures, although the flow values of the frits according to DIN 51 161 increase with increasing Na content.

This is surprising and contradicts the known state of the art which proceeds on the basis that frits with a high $B_2O_3$ content promote wetting and soft base enamels bond more firmly than hard base enamels (filling base enamels, network base enamels) having the same bonding oxide content.

It may also be seen from the stoving series that the more the frits deviate from the atomic ratio according to the invention given by Si:B:Na = 1:1:1, the weaker is the bonding of the base enamel on steel substrates. As may be expected, enamels having the composition $Si_1B_1Na_{1.4}Ni_{0.06}$ and $Si_1B_1Na_{0.6}Ni_{0.06}$ show virtually no bonding after they have been applied electrostatically to 1 mm steel sheets and stoved at temperatures in the region of 785° C. If, on the other hand, the two frits are mixed in equal parts so that the mixture again contains the ideal atomic ratio: $Si_1B_1Na_1Ni_{0.06}$, then enamelled metal sheets stoved at 785° C. are surprisingly found to show excellent bonding, This means that bonding at low stoving temperatures can also be achieved with frit combinations in which the individual components deviate from the atomic ratio according to the invention, but fulfil the requirement Na:B:Si=1:1:1 when they are mixed together.

The simple $Si_1B_1Na_1Ni_{0.06}$ system is only in exceptional cases suitable for application as a slip. The relatively high solubility of the frits when they are milled or stored alters the flow properties of the slip and hence its properties for application. Elements which stabilize the glass structure were therefore introduced to reduce leaching.

It has been found advantageous to replace sodium within certain limits by other alkali metals, such as potassium and/or lithium, and to replace part of the boron by aluminium and part of the silicon by zirconium. Enamels of this type are again distinguished by their good bonding at low temperatures, so long as the atomic ratio $Me^{+4}:Me^{+3}:Me^{+1}=1:1:1$ remains unchanged. The atomic numbers $Na_{1-x}(Li+K)_xB_{1-x}Al_x$-$Si_{1-x}Zr_xNi_{0.06}$ then represent the limit for this compensation.

It has also been found that alkaline earth metals such as calcium and/or barium may be introduced instead of alkali metals without any significant change in the bonding properties, provided the atomic numbers for the alkaline earth metal equivalent ($Me/2$) do not exceed 20% of the Na. The formula alkali metals$_{1-x}$alkaline earth metal$_{x/2}Me^{+3}_{1.0}Me^{+4}_{1.0}Ni_{0.06}$ (x up to 0.2) then applies. The introduction of other elements, such as fluorine in the form of fluoride or phosphorus in the form of phosphate, may occasionally have an advantageous effect on the flow properties of the slips, the melting properties and the surface smoothness. The combination rule according to the invention based on the valencies of the elements again applies: Σ Alkali metal atoms+2Σ alkaline earth metal atoms−Σ fluorine atoms−Σ phosphorus atoms=Σ boron atoms+Σ aluminum atoms=Σ silicon atoms+Σ zirconium atoms.

The best results were obtained with 4% by weight NiO. No further improvement in bonding may be obtained by increasing the Ni content. Cobalt oxide and copper oxide may be used as bonding oxides in addition to nickel oxide; and manganese oxide and iron oxide may be added for color. On economical grounds alone, the ratio Ni:Co (Cu) should not be less than 3:1.

The object of the present invention will now be explained with reference to the following Examples.

EXAMPLES

Example 1

An enamel frit of the following composition was obtained by melting commercially available enamel raw materials in a fire clay crucible of 500 ml capacity at 1100° C.:

|  | % by Weight |  | Atomic number per 10,000 |
|---|---|---|---|
| $Na_2O$ | 15.61 | Na | 2,320 |
| $Li_2O$ | 1.90 | Li | 585 |
| $K_2O$ | 1.40 | K | 137 |
| BaO | 1.83 | Ba | 55 |
| CaO | 0.65 | Ca | 54 |
| MgO | 0.30 | Mg | 34 |
| F | 0.96 | F | 232 |
| $P_2O_5$ | 4.45 | P | 289 |
| $B_2O_3$ | 19.94 | B | 2,638 |
| $Al_2O_3$ | 1.98 | Al | 179 |
| $SiO_2$ | 33.32 | Si | 2,554 |
| $ZrO_2$ | 5.81 | Zr | 217 |
| $TiO_2$ | 0.69 | Ti | 40 |
| NiO | 3.95 | Ni | 244 |

-continued

|  | % by Weight |  | Atomic number per 10,000 |
|---|---|---|---|
| CoO | 0.40 | Co | 24 |
| $Fe_2O_3$ | 3.76 | Fe | 217 |
| CuO | 2.47 | Cu | 143 |
| MnO | 0.58 | Mn | 38 |
| Σ(Na,Li,K) + 2Σ(Ba,Ca,Mg) − F − EP = |  |  | 2807 |
| Σ(B,Al) = |  |  | 2817 |
| Σ(Si,Zr,Ti) = |  |  | 2811 |

The melt, which had become homogeneous and "thread smooth" after 20 to 30 minutes, was chilled between steel rollers and the glass band obtained was broken. The resulting flakes were applied to steel substrates by electrostatic means as a powder and by spraying as a slip and stoved in a graduated oven at a temperature range of from 770° to 880° C.

Powder Application 100 g of enamel flakes and 0.4 g of methyl-hydrogen-siloxane were ground in a porcelain ball mill as described in Example 2, herein below until the residue of powder on the 16,900 mesh screen (width of mesh 40 μm) was less than 20%.

The powder, which had a surface resistance of more than $10^{12}$ Ω, was sprayed on steel sheets 60×450 mm from an electrostatic spray gun with application of a voltage of 70 kV to form a uniform layer 1 mm in thickness. After the application of 14 g of powder (5.2 g/dm²), the steel sheets were stoved in a graduated furnace for 10 minutes. The strips of steel sheet were
(a) degreased
(b) not degreased.

Application of Slip 1000 g of flakes were ground in a ball mill containing 3500 g of heavy grinding balls to form a slip according to the following formulation:

|  | % by weight |
|---|---|
| Frit | 100 |
| Clay | 6 |
| Sodium nitrite | 0.1 |
| Borax | 0.2 |
| Calcium silicate hydrate | 0.1 |
| Water | about 50 |
| Degree of grinding | 1 % residue on a 3600 mesh screen |
| Density | 1.70 g/ml. |

This slip was applied to the above-mentioned steel strips by spraying to form an enamel layer which had a thickness of 0.15 mm after stoving. After drying, the sample strips were stoved in a graduated oven in a temperature range of from 770° to 880° C. for 10 minutes. The steel had previously been prepared by degreasing in the usual manner. The bonding test with falling apparatus showed excellent bonding over the whole temperature range.

EXAMPLE 2

To prepare frits 1 to 9 of the system $Si_1B_1Na_{0.6-1.4}Ni_{0.06}O_z$, the raw materials, borax $Na_2B_4O_7$, soda $Na_2CO_3$, quartz powder $SiO_2$ and nickel oxide NiO, were weighed out in stoichiometric proportions, mixed, and melted in fire clay crucibles at 1100° C. for 25 minutes, using an electrically heated muffle furnace, and the melt was chilled between steel rollers and the resulting glass band was broken up into flakes.

100 g portions of these flakes were ground up in a Bloch-Rosetti mill containing 30 grinding balls with a total weight of 240 g with the addition of 0.4 g of methyl-hydrogen-siloxane until the residue of powder on the 40 μm screen (16,900 meshes/cm) was less than 20%.

The enamel powder was applied to conventionally degreased steel sheets 100×100 mm×1.0 mm in thickness by means of a commercial electrostatic spray gun with application of a voltage of 70 kV to the corona discharge electrode. After the application of 5.2 g of powder/dm², the coated sample plates were stoved at 770° C., 785° C. and 805° C., respectively.

The bond strength was tested by means of the falling apparatus according to DEZ Merkblatt F 6.2. In this test, a striking pin which was hemispherical at one end and weighed 2000 g was dropped on the enamelled test plate from a height of 750 mm. The bond strength was assessed visually on the deformed sample.

It is found that optimum bonding, especially at low temperatures, is obtained with frits which correspond approximately to the atomic ratio Si:B:Na:Ni=1:1:1:0.06.

EXAMPLE 3

Frits Nos. 1 and 9 of Example 2, which alone provided no bonding over the whole temperature range of from 770° to 830° C., were milled in equal amounts (in each case 50 g) with 0.4% by weight of polysiloxane in a ball mill, as already described. The powder was sprayed on pretreated steel sheets 60×450 mm and 1 mm in thickness by means of a commercial electrostatic spray gun and stoved in a graduated oven adjusted to a temperature range of from 770° C. to 880° C.

The bonding test with the falling apparatus showed excellent bonding over the whole temperature range.

It will be appeciated that the instant specification and claims are set forth by way of illustration and not limitation and that various modifications and changes may be without departing from the spirit and scope of the present invention.

We claim:

1. A base or a direct enamel frit which provides improved bonding at stoving temperatures below 800° C. after the frit has been stoved on unalloyed steel which is capable of being enamelled, which frit comprises the following composition

| | weight % |
|---|---|
| Na$_2$O | 5 to 25 |
| K$_2$O | 0 to 12 |
| Li$_2$O | 0 to 8 |
| BaO | 0 to 26 |
| CaO | 0 to 16 |
| MgO | 0 to 2 |
| F | 0 to 10 |
| B$_2$O$_3$ | 5 to 30 |
| Al$_2$O$_3$ | 0 to 10 |
| SiO$_2$ | 25 to 65 |
| ZrO$_2$ | 0 to 16 |
| TiO$_2$. | 0 to 14 | the frit comprising 1 to 6% by weight, based on the total quantity of the frit, of bonding oxides and the other constituents so chosen that the following equation is fulfilled:

$(\Sigma Li-, Na, K\text{-atoms} + 2\Sigma Ba-, Ca-, Mg\text{-atoms} - \Sigma \text{fluorine atoms} - \Sigma \text{phosphorus atoms})$ $= (\Sigma \text{boron atoms} + \Sigma \text{aluminum atoms})$ $= \Sigma \text{silicon atoms} + \Sigma \text{zirconium atoms} + \Sigma \text{titanium atoms},$ in which the deviation from the ratio 1:1:1 is at most ±8% for each of the three ratio components.

2. An enamel frit according to claim 1, wherein the deviation is at most ±6%.

3. An enamel frit according to claim 1, wherein the deviation is at most ±4%.

4. An enamel frit according to claim 1, wherein the frit comprises 2 to 4% by weight of bonding oxides, based on the total quantity of the frit.

5. An enamel frit according to claim 1, wherein the bonding oxide is selected from the group consisting of nickel oxide and nickel oxide with cobalt oxide, nickel oxide with copper oxide, nickel oxide with manganese oxide, nickel oxide with iron oxide and nickel oxide with cobalt oxide and one or more of copper oxide, manganese oxide and iron oxide.

6. An enamel frit according to claim 1, wherein the frit has the formula $Si_1B_1Na_{0.6 to 1.4}Ni_{0.06}.$ 7. An enamel frit according to claim 1, wherein the frit has the formula $Na_{1-x}(Li+K)_xB_{1-x}Al_xSi_{1-x}Zr_xNi_{0.06},$ where x is up to 0.2.

8. An enamel frit according to claim 1, wherein the frit has the formula alkali metals$_{1-x}$alkaline earth metal$_{x/2}$Me$^{+3}_{1.0}$Me$^{+4}_{1.0}$Ni$_{0.06}$, where x is up to 0.2.

9. An enamel frit according to claim 1, wherein the sum of Mg, Ca and Ba atoms is at most 10% of the Na atoms.

* * * * *